United States Patent
Leatherman

(10) Patent No.: US 6,710,701 B2
(45) Date of Patent: Mar. 23, 2004

(54) RFID TAG LOCATION USING TAG OR HOST INTERACTION RECORD

(75) Inventor: Russel Dean Leatherman, Summerfield, NC (US)

(73) Assignee: Gilbarco Inc., Greensboro, NC (US)

( * ) Notice: Subject to any disclaimer, the term of this patent is extended or adjusted under 35 U.S.C. 154(b) by 260 days.

(21) Appl. No.: 09/798,266

(22) Filed: Mar. 2, 2001

(65) Prior Publication Data

US 2001/0034565 A1 Oct. 25, 2001

Related U.S. Application Data

(62) Division of application No. 09/064,575, filed on Apr. 22, 1998.
(51) Int. Cl.$^7$ ............................................. G05B 19/00
(52) U.S. Cl. .................. 340/5.61; 702/150; 364/528.17
(58) Field of Search .................. 340/5.61; 702/150, 702/250; 364/528.17

Primary Examiner—Michael Horabik
Assistant Examiner—Matsuichiro Shimizu
(74) Attorney, Agent, or Firm—Withrow & Terranova, P.L.L.C.

(57) ABSTRACT

A system to store a sequence of data records relating to attributes of interactions between fuel dispensers and tags. The data records at a location remote from the tag, such as a fuel dispenser, central site controller or other network. The data records may contain the identity of the dispenser, tag and any attribute of a received signal, such as frequency band or signal strength, or other attribute indicative of proximity. Every dispenser that attempts to communicate with a tag adds its own interaction data to a history of a tag's past interactions with same and other dispensers. When a dispenser or central site control system examines the contents of the interaction histories, the detected presence of other dispensers or the relative strength of the recorded interaction attributes will determine action(s) to be taken by the dispensers or central site control system to communicate with the tag at issue.

11 Claims, 12 Drawing Sheets

RFID TAG LOCATION USING TAG OR HOST INTERACTION RECORD

This is a divisional of application Ser. No. 09/064,575, filed Apr. 22, 1998.

BACKGROUND OF THE INVENTION

The present invention relates generally to communicating with transponders in a fueling environment and, more particularly, to a dispensing system capable of arbitrating between competing tags and dispensers to ensure a dispenser communicates with the tag most proximate to that dispenser.

In recent years, traditional gasoline pumps at service stations have evolved into elaborate point-of-sale (POS) devices having sophisticated control electronics and user interfaces with large displays and touch pads (or screens). These dispensers include various types of payment means, such as card readers, to expedite and further enhance fueling transactions. A customer is not limited to the purchase of fuel at the dispenser. More recent dispensers allow the customer to purchase services, such as car washes, and goods such as fast food or convenience store products at the dispenser. Once purchased, the customer need only pick up the goods and services at the station store.

Given the ever increasing demand to increase transaction efficiency by both fuel suppliers and customers, transaction systems associated with the service stations are further evolving to provide fully automated authorization and purchasing. It would be advantageous if customers no longer needed to use a credit/debit card or smartcard to purchase fuel or other products or services. This can be accomplished if the customer, vehicle or both are equipped with a remote intelligent communications device, or transponder (hereinafter referred to as a tag for simplicity), capable of remotely communicating with fuel dispensers and other devices as desired. These tags and dispensers operate in conjunction to provide a cashless and cardless transaction system where transactions are automatically charged or debited without requiring any action by the customer. A tag is a remote communication device capable of uni-directional or bi-directional communications to and/or from a fuel dispenser's remote communications system.

Numerous patents have issued and foreign applications published relating to technology associated with communicating information between a tag or like transponder and the fuel dispenser. These patents disclose communicating between the tag and fuel dispenser with fiber optics, electromagnetic radiation, such as radio frequency transmissions, infrared, direct electrical connections and various others means or combination of these means. Various types of information are communicated between the tag and the dispenser including vehicle identification, customer identification, account information, fuel requirements, diagnostics, advertising, and various other types of solicited and unsolicited messages. Certain specific applications equip the tag and dispenser with cryptography electronics to encrypt and decrypt data transferred between the tag and dispenser.

Tag transponder technology is used in many areas of technology relating to vehicles. Such technology is used in tracking vehicles, navigational aids, toll collection, diagnostics, vehicle security and theft deterrence, keyless entry, refueling, collision avoidance, vehicle identification, surveillance and traffic control as well as transmitting and receiving financial data.

In theory, such communications between a tag and a fuel dispenser appear to be an answer to increasing transactional efficiencies. However, when multiple tags are used in an application where a single tag can be read by multiple devices, the problem of location arbitration becomes an issue. Location arbitration is defined as the process of determining the physical closest proximity of a tag to a dispenser in applications where the proximity of the tag to the dispenser basically determines which dispenser should interact with the tag.

One example is the use of a tag to authorize a credit card transaction at a gasoline dispenser in place of a credit card. In this instance, multiple dispensers might have the ability to read the same tag but, by nature of the application, only the dispenser that is closest to the tag is meant to interact with the tag. To further complicate the issue, numerous tags may be within a single dispenser's communication field to provide a situation where multiple dispensers are talking with multiple tags. Although current systems are available for determining the existence and identity of tags, applicants are not aware of any systems providing an economical and effective system and process to associate the proximity of a tag with the various dispensers in close proximity to each other.

SUMMARY OF THE INVENTION

The present invention provides a system to store a sequence of data records relating to attributes of interactions between fuel dispensers and tags. The data records may be stored on the tag or at a location remote from the tag, such as a fuel dispenser, central site controller or other network. The data records may contain the identity of the dispenser, tag and an attribute of a received signal, such as frequency band or signal strength, or other attribute indicative of proximity. Every dispenser that attempts to communicate with a tag in question adds its own interaction data to a limited history of a tag's past interactions with the same and other dispensers. When a dispenser or central site control system examines the contents of the interaction histories, the detected presence of other dispensers or the relative strength of the recorded interaction attributes will determine what, if any, action is to be taken by the dispensers or central site control system to communicate with the tag at issue.

Accordingly, one aspect of the present invention provides a remote communication unit arbitration system including a housing, a control system that has memory and is associated with the housing, and communication electronics operatively associated with the control system. The communication electronics may have a transmitter for transmitting signals to a remote communication unit and a receiver for receiving signals from the remote communication unit. The arbitration system also includes monitoring electronics having an input associated with the control system and an output associated with the communication electronics. The attribute monitoring electronics are adapted to 1) monitor an attribute of a signal received by the communication electronics wherein the attribute is indicative of the relative proximity of the remote communication unit and the housing, and 2) provide the control system with a new proximity value indicative of the relative proximity of the remote communication unit and the housing. The control system is preferably adapted to compare the new proximity value with a prior proximity value from a prior communication with the remote communication unit and determine a relative proximity of the remote communication unit to the housing with respect to a communicative device associated with the prior communication based on the new and prior proximity values.

The control system may also be adapted to obtain the prior proximity value from a record in an interaction attribute database having a listing of records wherein each record includes 1) a prior proximity value associated with a prior communication with the remote communication unit from a communicative device, and 2) communication indicia of the communicative device. The control system may also be adapted to cause the new proximity value to be added as a record to the interaction attribute database in association with a unique identification indicia representative of a communicative device. The control system may determine the relative proximity of the remote communication unit by determining the proximity value representative of the closest proximity. The interaction attribute database may be located at the remote communication unit wherein the control system is adapted to access the database via radio communications through the communication electronics or the interaction attribute may be located at a central control system apart from the housing.

Another aspect of the present invention provides a fuel dispenser for independently arbitrating the proximity of remote communication units wherein a remote communication unit has an interaction attribute database having a listing of records. Each record includes an interaction attribute associated with a prior communication between the remote communication unit and a communicative device and an identification indicia of the communicative device. The dispenser includes a control system having memory associated with the housing and communication electronics operatively associated with the control system having a transmitter and a receiver. The control system is adapted to a) determine an interaction attribute indicative of a relative proximity of the communications between the remote communication unit and the fuel dispenser; b) obtain from the remote communication device via the communication electronics, 1) a proximity value associated with a prior communication between the remote communication unit and a communicative device, and 2) an identification indicia of the communicative device; and c) determine a relative proximity of the fuel dispenser with respect to a communicative device based on the interaction attributes associated with the fuel dispenser and the communicative device.

The interaction attribute may be derived from a signal strength measurement made by the control system. In such embodiment, the control system may include signal strength electronics configured to provide the interaction attribute proportional to a strength measurement of a signal received by the communication electronics. The signal strength electronics may include automatic gain control circuitry adapted to amplify the received signal to a nominal signal strength. The gain control circuitry may include an output proportional to the gain necessary to amplify the received signal to the nominal signal strength, wherein the output represents the interaction attribute.

In particular, the gain control circuitry may include a variable gain amplifier having a gain input and a signal wherein the signal input receives the received signal from a remote communication unit. The gain control circuitry also includes a gain control amplifier having an input derived from the normalized signal of the variable gain amplifier's output and an output representing the amount of gain necessary to normalize the received signal. The output also provides feedback to the variable gain amplifier. The output of the gain control amplifier may be fed into a digital-to-analog converter to provide a digital string representing an amount of gain necessary to normalize the received signal. Those skilled in the art will be aware of other common methods of determining signal strength.

Alternatively, the interaction attribute may be derived from detecting a number of errors occurring during a communication between the remote communication unit and a communicative device. The control system may be adapted to count the number of errors during the communication to provide an interaction attribute wherein the number of errors occurring during a communication is indicative of a relative proximity. Similarly, the interaction attribute may be derived from detecting a number of attempts at communication without completion between the remote communication unit and a communicative device. In general, the interaction attribute may be virtually any attribute indicative of a relative proximity between the remote communication unit and the fuel dispenser. Furthermore, the interaction attributes may be monitored or checked to determine if other communicative devices have communicated with the remote communication unit, where the remote communication unit has been, its direction of travel and movement, as well as whether or not the remote communication unit is moving.

Yet another aspect of the present invention provides a method of independently arbitrating between remote communication units wherein records are either stored at a central control system or on the remote communication unit. The method typically comprises 1) transmitting a signal to a remote communication unit; 2) receiving an identification indicia from the remote communication unit; 3) determining an interaction attribute indicative of a relative proximity of communication between the remote communication unit and the dispenser based on the received signal; 4) obtaining from the remote communication unit a proximity value associated with a prior communication between the remote communication unit and a communicative device and an identification indicia of the communicative device; and 5) determining a relative proximity of the fuel dispenser with respect to the communicative device based on the interaction attributes associated with the fuel dispenser and the communicative device.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
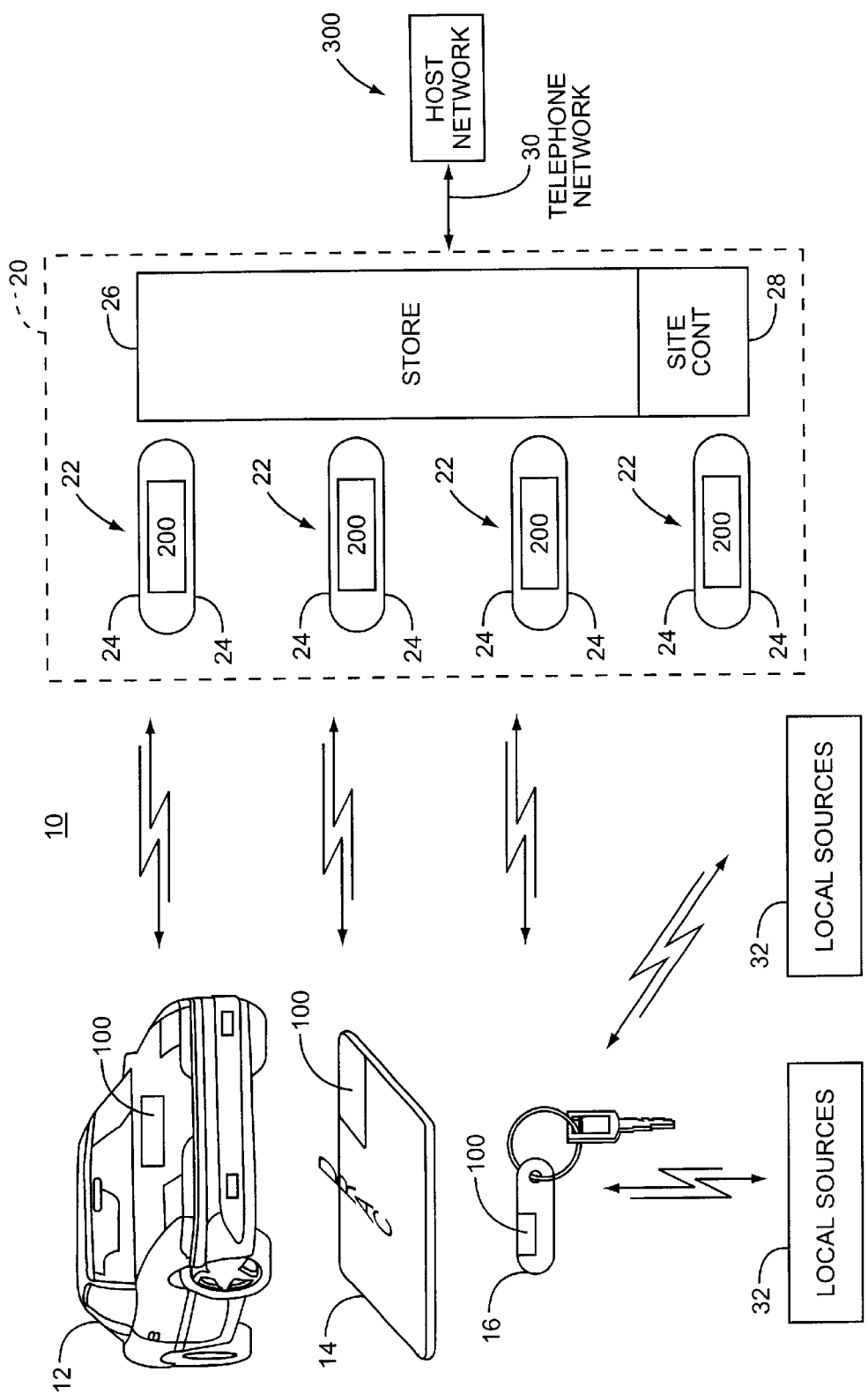
FIG. 1 is a schematic of a service station constructed and implemented according to a preferred embodiment of the present invention including various possible tags interacting with fuel dispensers and a host network through a central control system.

In the following description, like reference characters designate like or corresponding parts throughout the several figures. Referring now to the drawings in general, and FIG. 1 in particular, please understand that the illustrations are for the purpose of describing preferred embodiments of the invention and are not intended to limit the invention thereto. As best seen in FIG. 1, a retail transaction system generally designated 10, is shown constructed according to a preferred embodiment of the present invention. The transaction system 10 typically includes or is associated with three subsystems: a remote communication unit 100 (hereinafter a tag); a fuel dispenser 200 and a host network 300. In general, remote communication units 100 are adapted to communicate with and through the fuel dispenser 200 in order to obtain authorization and communicate information to and from the various subsystems. The tag 100 may also communicate with other local sources 32 directly.

Various means of security are employed depending on the information being communicated and the source and destination of the information. The tag 100, POS device 200 and host network 300 may be adapted to encrypt and decrypt certain communications there-between. For additional detail relating to secure communications, attention is drawn to U.S. application Ser. No. 08/895,417, filed Jul. 16, 1997, entitled Cryptography Security for Remote Dispenser Transactions, in the name of William S. Johnson, Jr.; U.S. application Ser. No. 08/895,282, filed Jul. 16, 1997, entitled Memory and Password Organization for Remote Dispenser Transactions, in the name of William S. Johnson, Jr.; and U.S. application Ser. No. 08/895,225, filed Jul. 16, 1997, entitled Protocol for Remote Dispenser Transactions, in the name of William S. Johnson, Jr. The disclosures of each of these applications are incorporated herein by reference. U.S. application Ser. Nos. 08/649,455 and 08/759,733 and provisional application Serial No. 60/060,066 disclose further details on similar communications systems and are also incorporated herein by reference.

The tag 100 is preferably integrated into a small carrying medium, such as a module mounted in or on a vehicle 12, a transaction card 14 or a key fob 16. Regardless of the medium carrying the tag 100, the tag is preferably designed to provide remote bi-directional communications with the fuel dispenser 200. Preferably, the fuel dispenser 200 is placed in a fuel dispensing environment 20, and in particular, at each of two fueling positions 24 of the fuel dispenser 22. The dispensers are operatively associated with a central station store 26 by a conventional wire system. The store 26 may house a convenience store as well as one or more restaurants, a car wash or other commercial establishment.

Many fuel dispensing environments 20 provide other goods and services, such as fast food and car washes. Generally the store 26 will include a central site controller 28 to provide central control functions for the entire site including each dispenser 22. Each dispenser, and its respective POS (point-of-sale) electronics, generally communicates either directly, or indirectly with the central site controller 28, which in turn may communicate with the host network 300 via a telephone network 30. The host network 300 generally provides authorizations and other data for the various transactions attempted at each fuel dispenser 200.

In addition to communicating with the fuel dispensers 200, the transponders 100 are also adapted to communicate with various other local sources 32 for various informational and transaction-type functions. These local sources 32 may include any number of goods or service providers, such as local quick-serve restaurants.

Figure 2A:
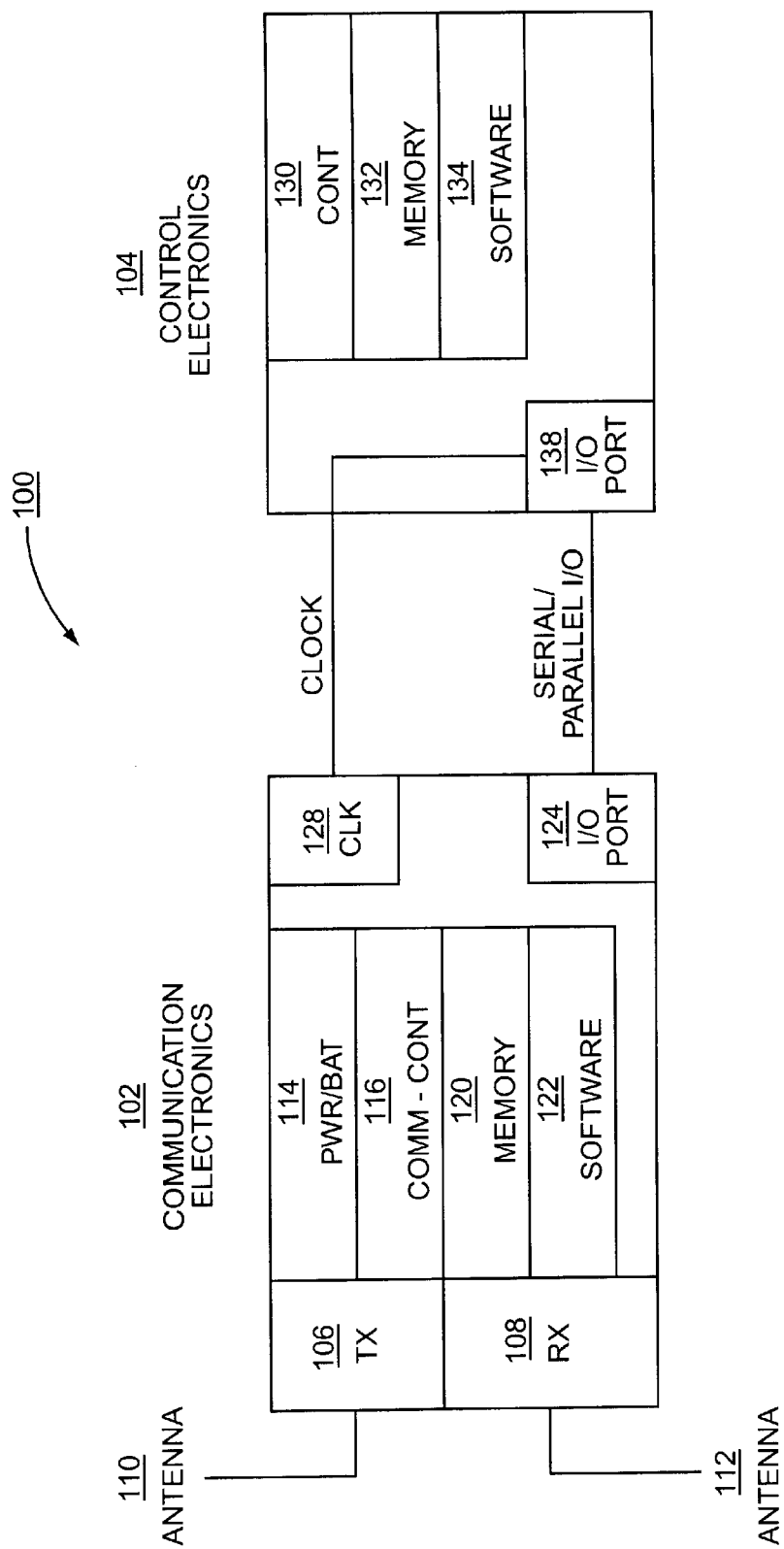
FIG. 2A is a block representation of the tag constructed according to the preferred embodiment.

The preferred embodiment of the tag 100 is shown in FIG. 2A. Communications electronics 102, adapted to provide remote communications with various remote sources, includes a transmitter 106 and receiver 108 having associated antennas 110, 112. The transmitter 106 and receiver 108 operate to transmit data from and receive data into the remote communications unit 100. The communications electronics 102 may also include a battery power supply 114, a communication controller 116 associated with a memory 120 having the software 122 necessary to operate the communications electronics 102 and communicate with the control electronics 104. Serial communications between the communication electronics 102 and the control electronics 104 is provided via the input/output (I/O) ports 124, 138 associated with the respective electronics. The communication electronics 102 provide a clock 128 signal to the I/O port 138 of the control electronics 104. The control electronics 104 may include a controller 130, memory 132 and software 134 to provide remote processing. The memory 120, 132 may include random access memory (RAM), read only memory (ROM), or a combination of both. Notably, the communication controller 116 and the general controller 130 may be integrated into one controller. Similarly the software and memory of the communication and general control modules may be merged. Notably, the communication electronics 104 and communication electronics 102 may be combined, and may also include encryption hardware or software.

Figure 2B:
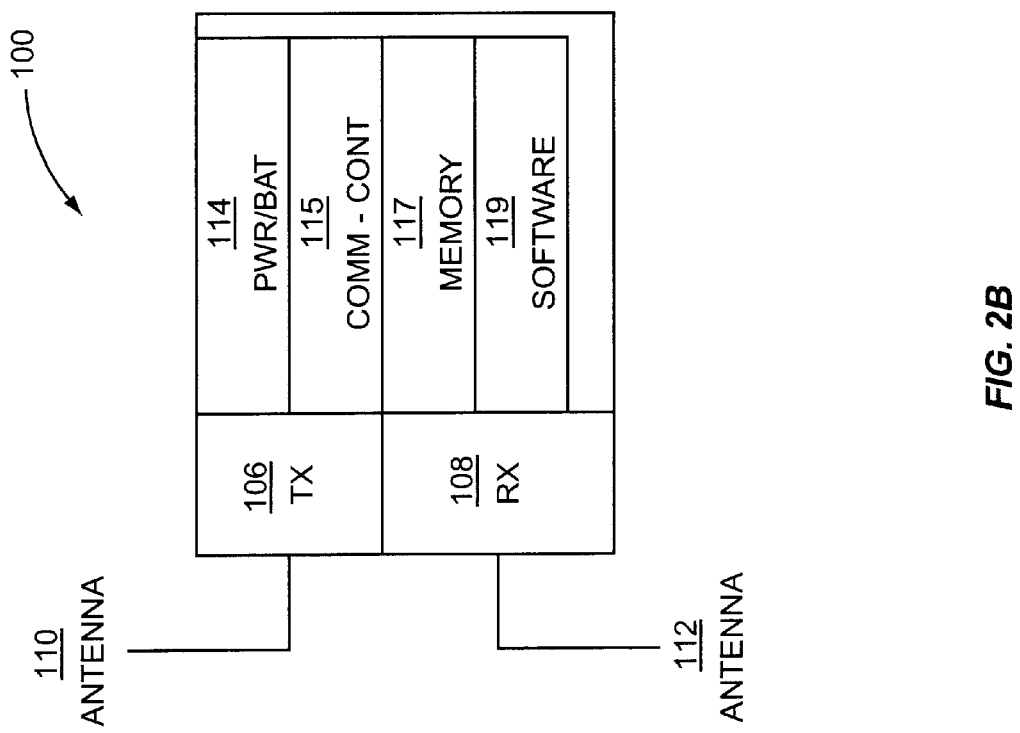
FIG. 2B is a block representation of the tag having integrated electronics constructed according to the preferred embodiment.

As shown in FIG. 2B, the communication and general control electronics, as well as any associated controllers may be integrated into a single controller system and/or integrated circuit. In such cases, a single controller 115 is associated with memory 117 having any software 119 necessary for operation. In such an integrated system, the controller 115 will carryout any control functions.

The communication electronics 102 are preferably the Micron MicroStamp™ produced by Micron Communications, Inc., 8000 South Federal Way, Boise, Id. 83707-0006. A detailed description of the MicroStamp™ is provided in the data sheets and the MicroStamp Standard Programmers Reference Manual provided by Micron Communications, Inc. These references and the information provided by Micron Communications on their website at HTTP://WWW.MCC.MICRON.COM are incorporated herein by reference. The Micron MicroStamp™ is an integrated system implementing a communications platform referred to as the MicroStamp™ standard on a single CMOS chip. The communications controller 116 preferably provides a spread spectrum processor associated with an eight-bit microcontroller. The memory 120 includes 256 bytes of RAM. The receiver 108 operates in conjunction with the spread spectrum processor and is capable of receiving direct sequence spread spectrum signals having a center frequency of 2.44175 GHz. The transmitter 106 is preferably a differential phase shift key (DPSK) modulated back-scatter transmitter transmitting DPSK modulated back-scatter at 2.44175 GHz with a 596 KHz sub-carrier. Notably, any type of communications scheme is acceptable, and the invention should not be limited to those discussed in the preferred embodiment.

In order to save power and extend battery life, the communication electronics 102 may operate at a low-current sleep mode until an internal programmable timer causes it to wake up. The communication electronics 102 determines whether there is a properly modulated signal present and, if not, immediately returns to the sleep mode. The modulated signal, which the communication electronics 102 monitors once it awakens, is provided by the fuel dispenser 200 or one of the local sources 32. If a properly modulated signal is present, the communication electronics 102 processes the received command and sends an appropriate reply. The communication electronics 102 then returns to the sleep mode. The communications electronics 102 causes the control electronics 104 to awaken as necessary to process data, receive information, or transmit information.

Figure 3:
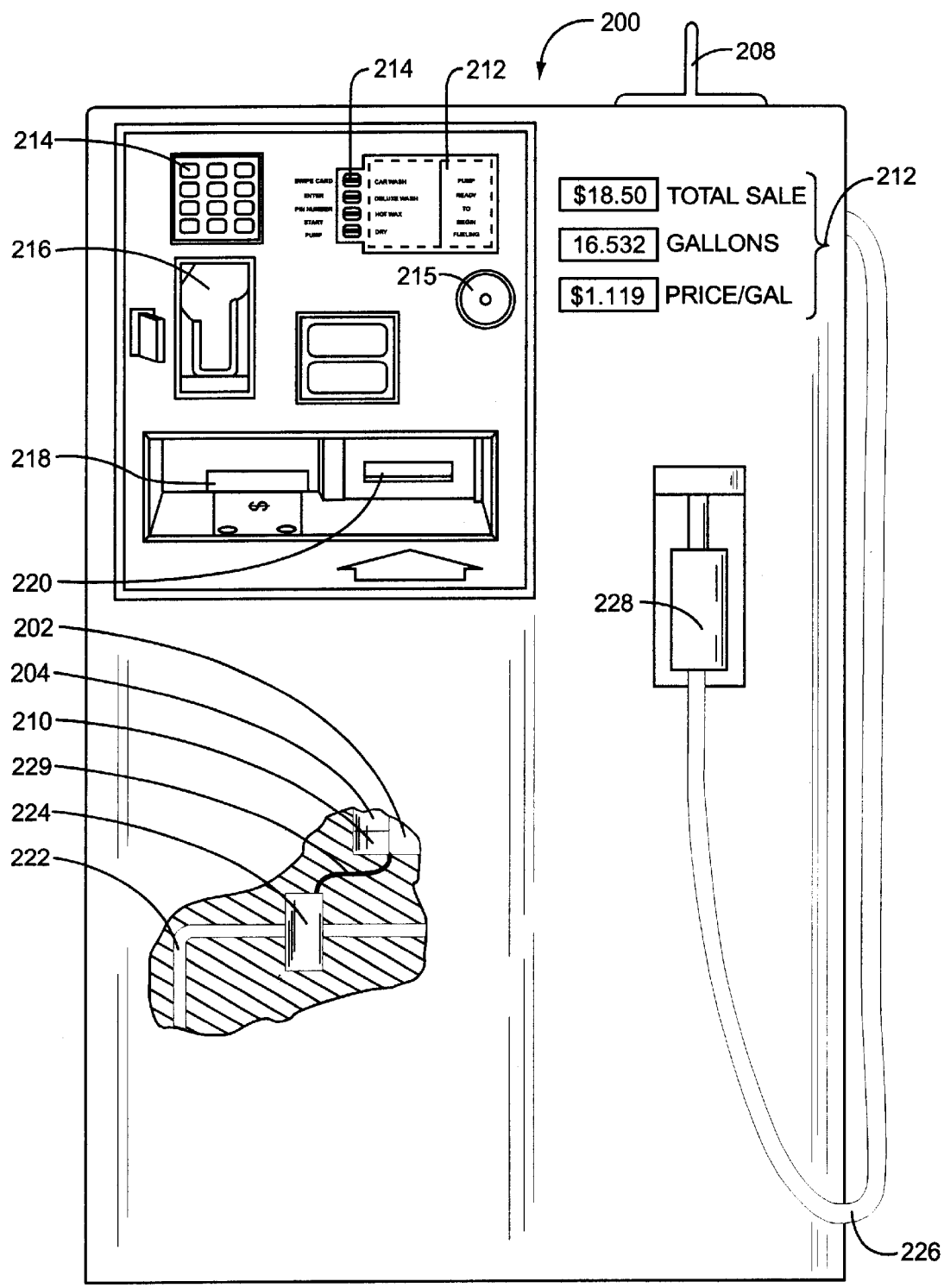
FIG. 3 is a an elevational view of a fuel dispenser constructed according to a preferred embodiment.
Figure 4:
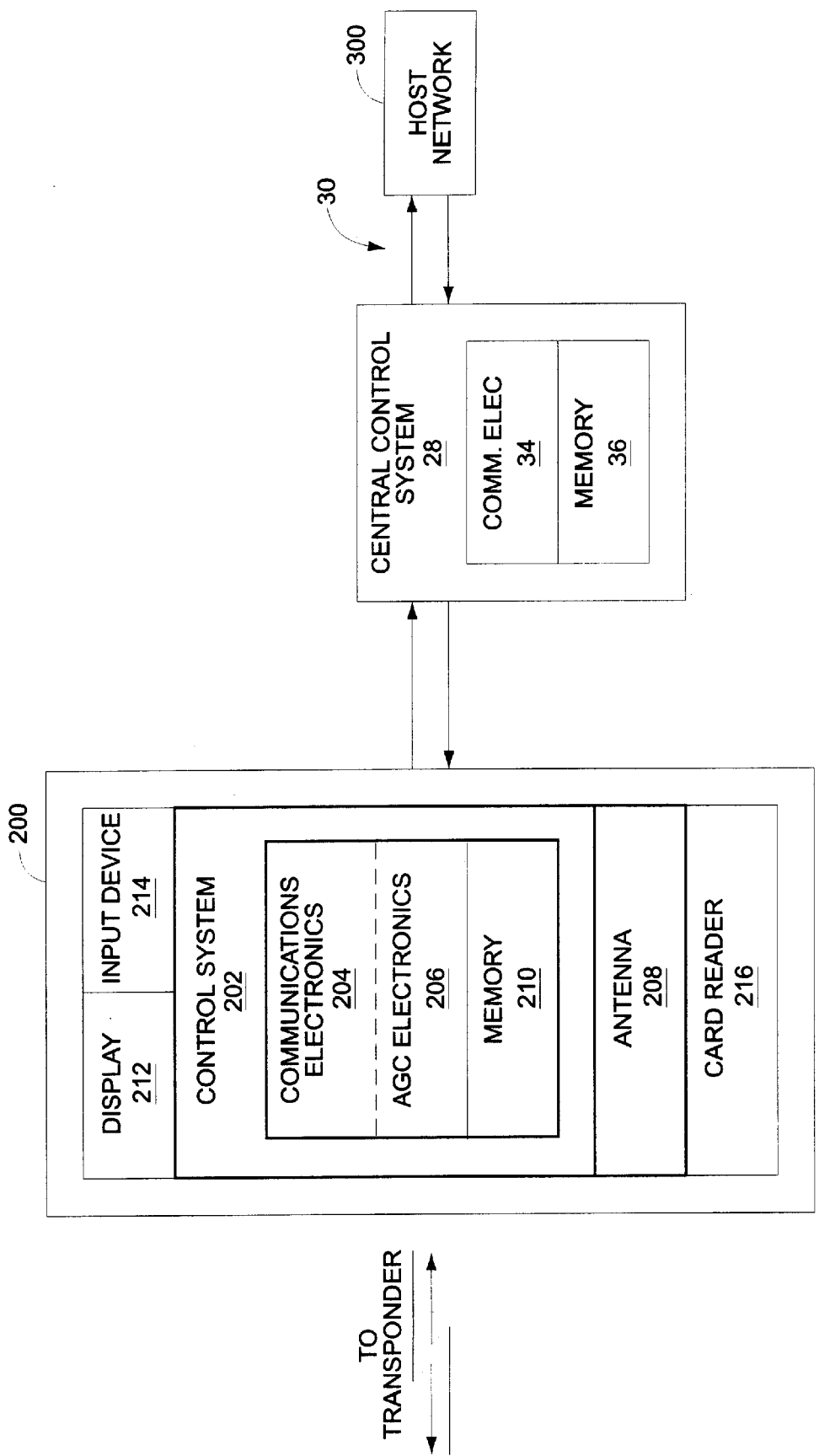
FIG. 4 is a block diagram of a fuel dispenser and central control system constructed according to the preferred embodiment.

As seen in FIGS. 3 and 4, a fuel dispenser 200 will preferably include a control system 202 having communications electronics 204 associated with an automatic gain control electronics 206 and one or more antennas 208. The control system 202 will also have sufficient memory 210 for operation. The control system 202 may also be associated with various displays 212 and input devices 214, such as keypads or touch screens. An audio system 215 may also be provided.

The dispenser 200 may also be equipped with a card reader 216, cash acceptor 218 and a receipt printer 220 for memorializing transactions. Each dispenser 200 is typically equipped with a conventional fuel supply line 222, metering device 224, delivery hose 226 and a nozzle 228. The metering device 220 communicates data relating to the volume of fuel dispensed along line 229 to the control system 202. In addition to the hardware described, the dispenser may include a vapor recovery system, flow control valves and related control hardware and electronics.

With reference to FIG. 4, the dispenser 200 is adapted to communicate with a tag (not shown) and the central control system 28, which may also communicate with the host network 300 through a standard telephone interface 30. The central control system 28 may include communications electronics 34 and a memory 36 having the requisite capacity and software necessary to run the control system and facilitate communications to and from the dispenser and host network.

Figure 5:
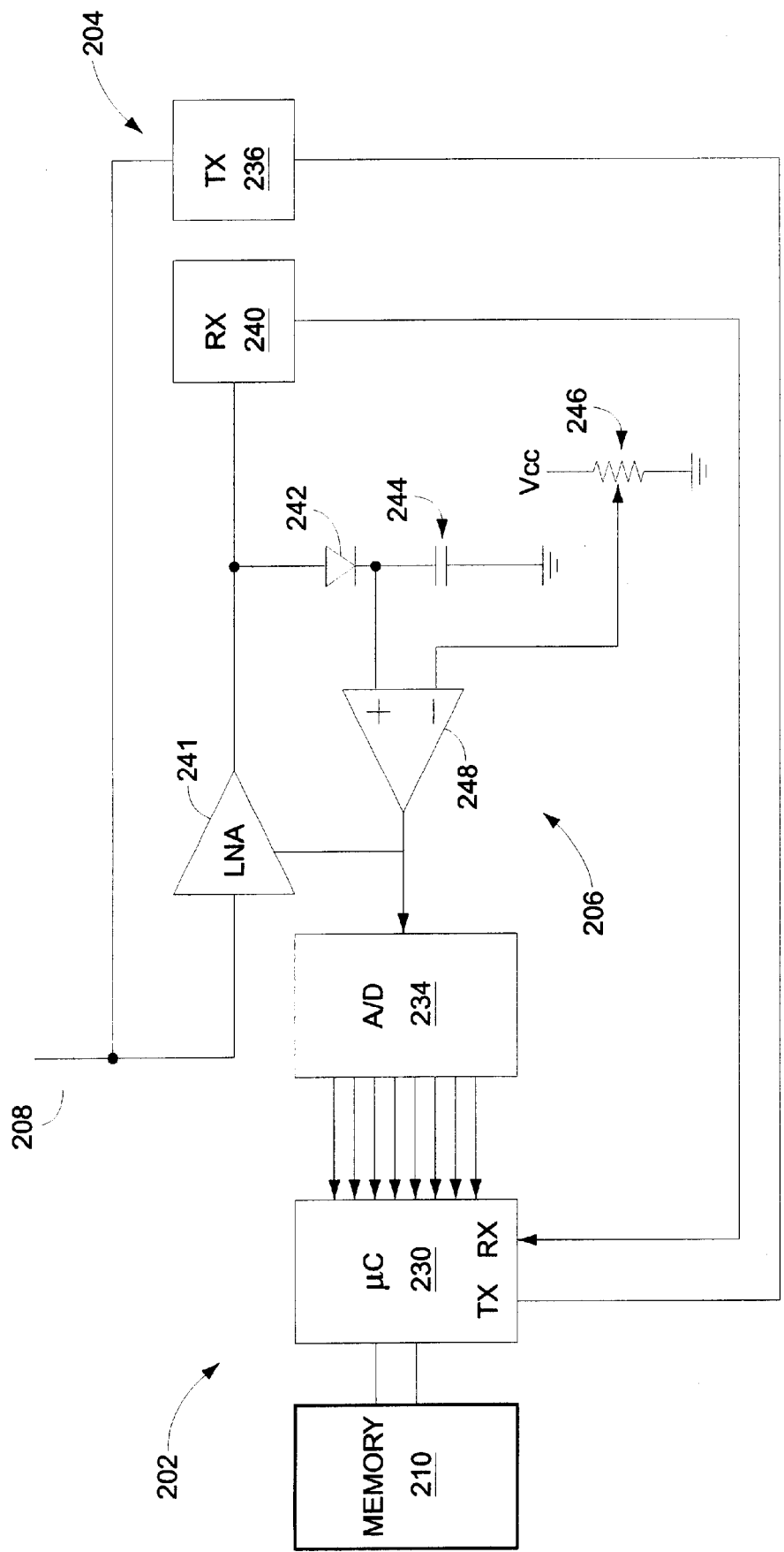
FIG. 5 is an electrical schematic of a fuel dispenser's control system having communication electronics and automatic gain control circuitry designed according to the present invention.

As shown in FIG. 5, the dispenser control system 202 and communications electronics 204 will preferably operate in association with automatic gain control electronics 206. These systems will operate together to amplify a signal received from a tag to a normalized level to ensure proper reception and demodulation at receiver 240, which provides a demodulated output to a microcontroller 230 of the control system 202. The demodulated output represents information transmitted from the transponder to the dispenser. The microcontroller 230 will receive the demodulated information and process the information accordingly.

The signal received at antenna 208 is initially sent to a low-noise amplifier (LNA) 241 having feedback resulting in the normalized output, which is sent to receiver 240. The normalized output is also sent to the feedback circuitry in the automatic gain control electronics 206. These feedback components include a diode 242, capacitor 244, amplifier 248, and a potentiometer 246. The potentiometer 246 is connected between power (vcc) and ground and is used to provide a reference voltage at the inverting input of amplifier 248.

The normalized signal from the low noise amplifier 241 is rectified through the diode 242 and charges capacitor 244 to a DC level indicative of the normalized output level of the low noise amplifier 241. The amplifier 248 provides an output indicative of the voltage differences received at the inverting and non-inverting inputs. This difference is indicative of the difference between the normalized output of the low noise amplifier 220 and the voltage reference set by the potentiometer 246. The output of amplifier 248 is proportional to the difference between the reference and the normalized output of the low noise amplifier 241 and is used to control the gain of the low noise amplifier 241. Thus, amplifier 248 will adjust the gain of the low noise amplifier 241 so that the normalized output of the low noise amplifier 240 results in a DC value at the non-inverting input equal to the reference value appearing at the inverting input of the amplifier 248. The output of the amplifier 248 is also sent to the analog to digital converter 234, which provides a digital string indicative of the amount of gain necessary to bring the signal originally received at antenna 208 up to a normalized level at the output of the low noise amplifier 241 and received by the receiver 240. The microcontroller will receive the digital string and preferably associate the string with a tag identification number (ID) in memory 210. Preferably, the signal received at the antenna 208 will include the tag ID.

In other words, when a signal from a tag appears at antenna 208, the communication electronics 204 and automatic gain control electronics 206 operate to normalize the signal for reception at the receiver 240, provide a value indicative of the amount of gain necessary to provide the normalized signal for reception and demodulate information on the received signal for the microcontrol system 202. Preferably, the communication electronics will take the form of an interrogator having the automatic gain control electronics integrated therein. The interrogator will provide an indicator of signal strength as well as the received signal itself to the control system 202.

In operation, tag arbitration may operate according to one of two basic processes. The first process creates a memory stack inside the intrinsic memory of the applicable tag. The tag records the short term history of any attempts by dispensers to access the tag along with attributes that indicate the quality of the interaction. Examples of these attributes include signal strength (i.e., the inverse of the gain signal determined above), number of errors recorded per transmission, and number of attempts at communication without completion. These latter attributes may be determined using hardware, software and techniques apparent to those of ordinary skill in the art. All of these attributes, or similar attributes, would indicate the quality of the interaction between the tag and the dispenser. Since signal strength, error rates and successful connection rates degrade with physical distance from the dispenser's communication electronics, degradation of the attributes is a representative indicator of the physical distance between the dispenser and the tag. For arbitration, the dispensers place their interaction data and attributes into any tag they read and other dispensers do the same, while preserving the data from past interactions. The dispensers retrieve the information stored in the tags. The multiple dispensers review the memory records within the tag and can determine that other dispensers have recently been writing to the tag. Each dispenser independently makes a determination based on the interaction attribute history as to which of the dispensers was closest to the tag and, thus, should be allowed to communicate solely with the tag in question.

The second process provides similar arbitration, with the exception that arbitration data is not stored in the tag, but is stored at the central site control system memory 36 (or perhaps in the dispensers or other associated system). In the latter process, the tag ID is stored in association with the dispenser communicating with the tag and the attribute indicative of proximity. The central control system 28 polls the various dispensers, updates the attribute records, and determines the dispensers closest to the respective tags. In any of the systems, the respective control systems may monitor movement, location and continued presence of any tag with respect to any of the dispensers communicating with the tag.

Figure 7:
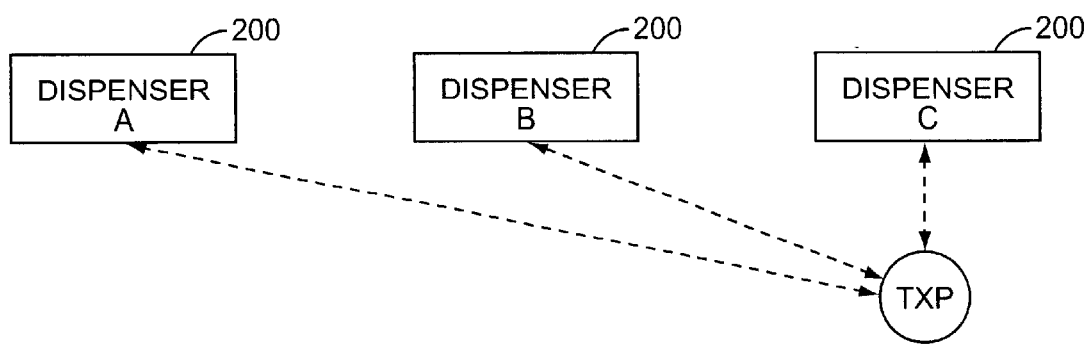
FIG. 7 is a schematic diagram of three fuel dispensers and a tag associated with the arbitration process of FIGS. 6A and 6B.
Figure 8:
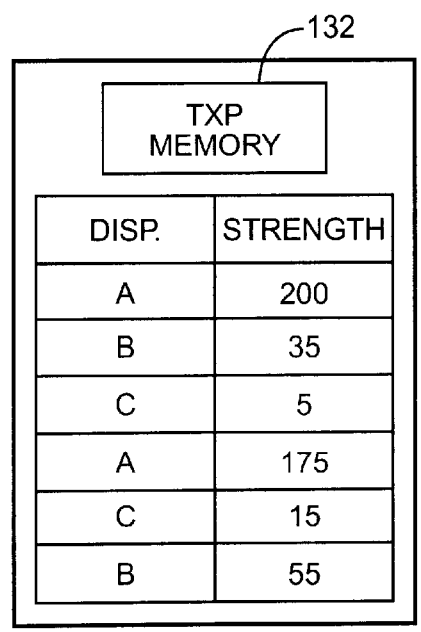
FIG. 8 is a schematic diagram exemplary of a tag memory associated with the process shown in FIGS. 6A and 6B.

Turning now to FIGS. 7 and 8, the process of the first embodiment will be described. In this embodiment, interaction histories between the various dispensers and the given tag are stored in the tag's memory 132. The dispenser communicating with the tag will examine the accumulated data stored on the tag and update the data as necessary for each interaction. As shown in FIG. 7, dispensers A, B and C either are or have recently communicated with the tag shown. The most recently updated history of interactions are shown in FIG. 8, which depicts the tag memory 132 and the history stored therein. The tag memory includes a series of interaction fields linking a dispenser with the relative strength of the communication associated therewith. For example, the tag memory indicates the most recent communication was made with dispenser A and the strength field has a value 200 stored in association with the communication with dispenser A. In this example, the strength field value (i.e., the gain required to normalize the reception) is inversely proportional to the distance between the tag and the dispenser.

In the preferred embodiment, the data string from the automatic gain control electronics 206 will be lower for strong signals because the amount of gain necessary to amplify the signal received at the antenna 208 to a normalized level is low. As can be seen in FIG. 8, the most recent communications with dispensers A, B and C (i.e., the top three records) indicate interaction strength values of 200, 35 and 5, respectively. This means that dispenser C is the closest to the tag, dispenser A is the furthest from the tag, and dispenser B is between A and C. The last three fields indicate communications with dispensers A, C and B, in that order, with resulting strength values of 175, 15 and 55, respectively. The values indicate that during the earlier sequence of communications with the three dispensers, dispenser C remained the closest and dispenser A was the furthest away from the tag. The strength values also indicate the tag was further away from dispenser C and closer to dispensers B and A than at the times of the more recent series of communications. From these values, the control system can determine that the tag is moving left to right, across drawing FIG. 7 (i.e., towards dispenser C from a direction closer to dispenser A).

Figure 6A:
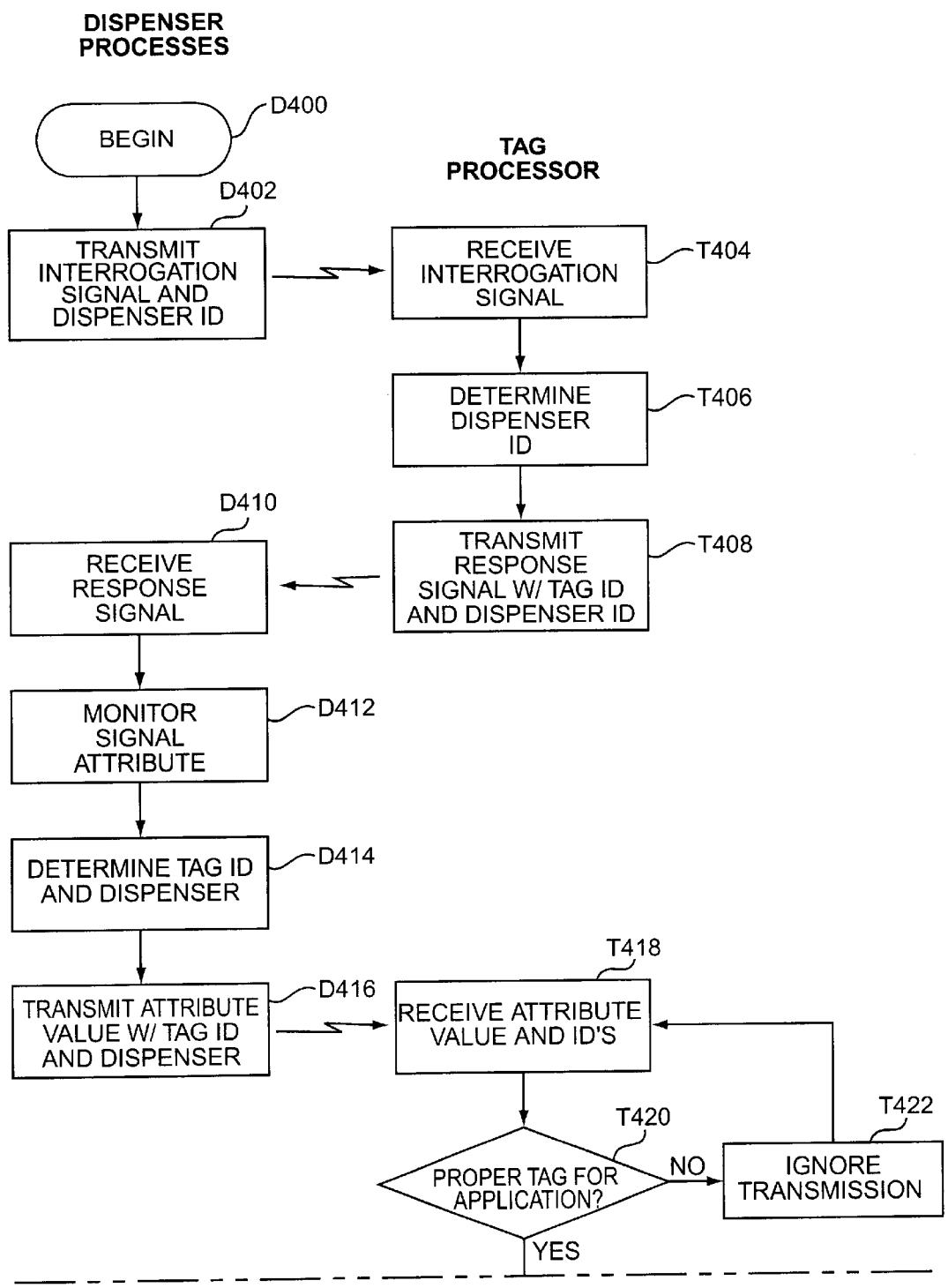
FIGS. 6A and 6B are a flow chart of a first tag arbitration process according to the present invention.
Figure 6B:
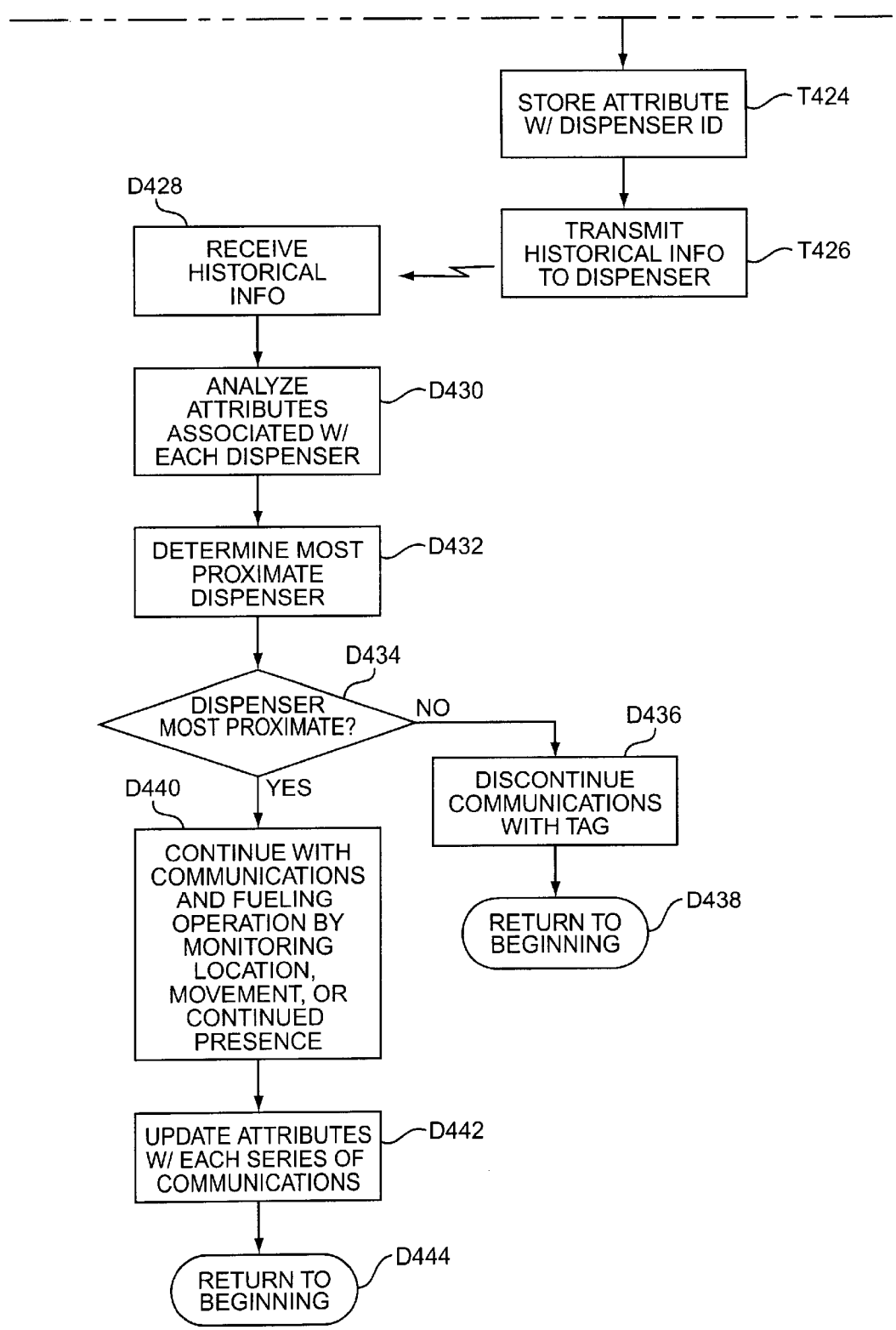

With these concepts in mind, FIGS. 6A and 6B illustrate the flow of the process that begins in block D400. The dispenser transmits an interrogation signal (block 402), which may include a dispenser identification number, to any of the tags within communication range. A tag receives the interrogation signal (block 404), determines the dispenser ID (block T406) and transmits a response signal including the transponder ID and dispenser ID (block T408). The dispenser receives the response signal (block D410) and monitors an attribute of the signal (block D412) to determine the relative signal strength and/or proximity of the responding tag to the dispenser. Notably, the response signal transmitted from the tag may be received at various dispensers simultaneously and each dispenser will receive the signal, monitor for signal attributes and otherwise function concurrently as discussed herein.

The dispenser may determine the transponder ID and the dispenser ID from the received response signal (block D414) and transmit the attribute values, the associated transponder ID and the dispenser ID (block D416). The various tags in the communication field receive the transmission and determine whether to accept or ignore the transmission based on the transponder ID. In other words, the tags likely receive signals intended for other tags in the communication field. Preferably, the transponder ID of the intended tag or other indicia allow the receiving tag to recognize communications intended for that particular tag and ignore communications directed to another tag. Thus, the receiving tag receives the transmitted attribute values and the transponder and dispenser ID's (block T418) and determines if communications were directed at the particular tag (block T420). If the communications were not meant for the tag, the transmission is ignored (block T422) and the tag waits to receive a communication directed to the tag (block T418).

If the communications are directed to the tag, the tag stores the attribute values in association with the dispenser ID (block T421) and transmits historical information relating to the historical interaction information, including attribute values and associated dispenser ID's (block T426). The dispenser receives the historical information (block D428) and analyzes the attribute values therein associated with each dispenser for the various communication entries (block D430). The dispenser determines the most proximate dispenser based on the current and historical information (block D432). The dispenser next determines if it is the most proximate dispenser to the tag (block D434). If it is not the most proximate dispenser, communications with that particular tag are discontinued (block D436) and the process returns to the beginning (block 438). If the dispenser is the most proximate to the tag, the dispenser continues with communications and possibly the fueling operation (block D440). During this period, the dispenser may continue to monitor communication attributes to derive the tag's location, determine if the tag is moving, and/or check for the continued presence of the tag.

Preferably, the dispenser updates the tags and transmits new attributes with each series of communications to the tag throughout the communication process (block D442) and, at the end of fueling, the process will return to the beginning (block D444). Notably, each dispenser in the fueling environment may be operating in the same manner. That is, various dispensers may be communicating with various tags to independently determine the dispenser closest to the tag, and each tag may communicate with various dispensers in a complementary fashion. Thus, each dispenser independently and concurrently arbitrates among the various tags to select the tag most likely to be associated with a fueling operation.

If a dispenser reads an attribute history and determines its identity as the last recorded contact, the dispenser may simply overwrite the last entry. If the dispenser sees its identity in the record along with the identities of other dispensers that have entered attribute records subsequent to the dispensers last communication, then the currently communicating dispenser may add additional records and preserve all past records, including those of other dispensers. Given that the number of records are of the finite number, it is preferred that new entries will destroy old entries in a first in-first out record structure.

Furthermore, the memory record 132 may be configured so that two or more competing dispensers are allowed to record a number of record attributes into the attribute history. The memory record would recycle and overwrite its oldest entries after a maximum number of entries for a particular dispenser is reached. In this way, a number of entries can be supported from each of the competing dispensers in order for each dispenser to independently calculate any average or normalized results so that a location decision can be made.

Figure 9A:
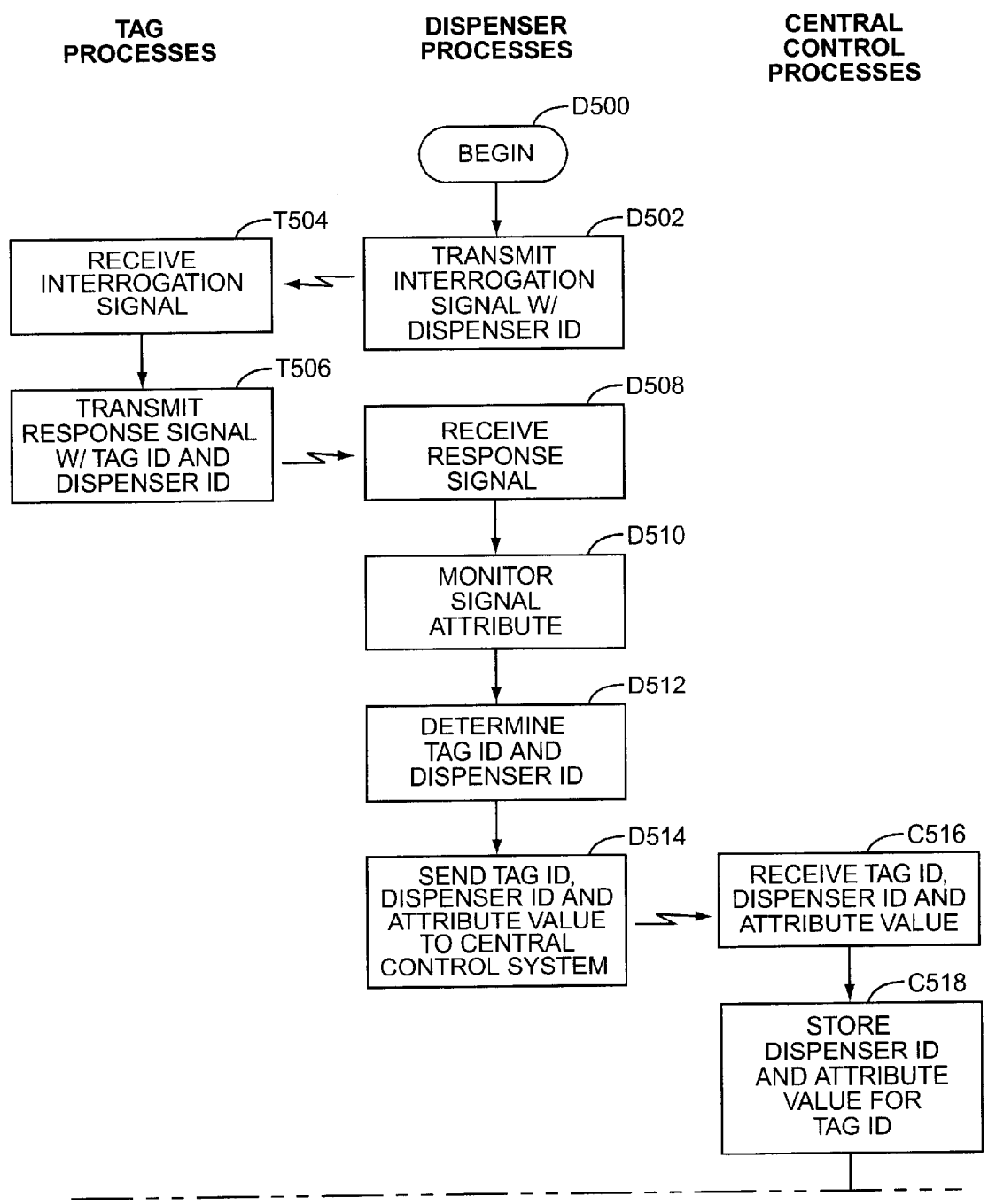
FIGS. 9A and 9B are a flow chart of a second tag arbitration process according to the present invention.
Figure 9B:
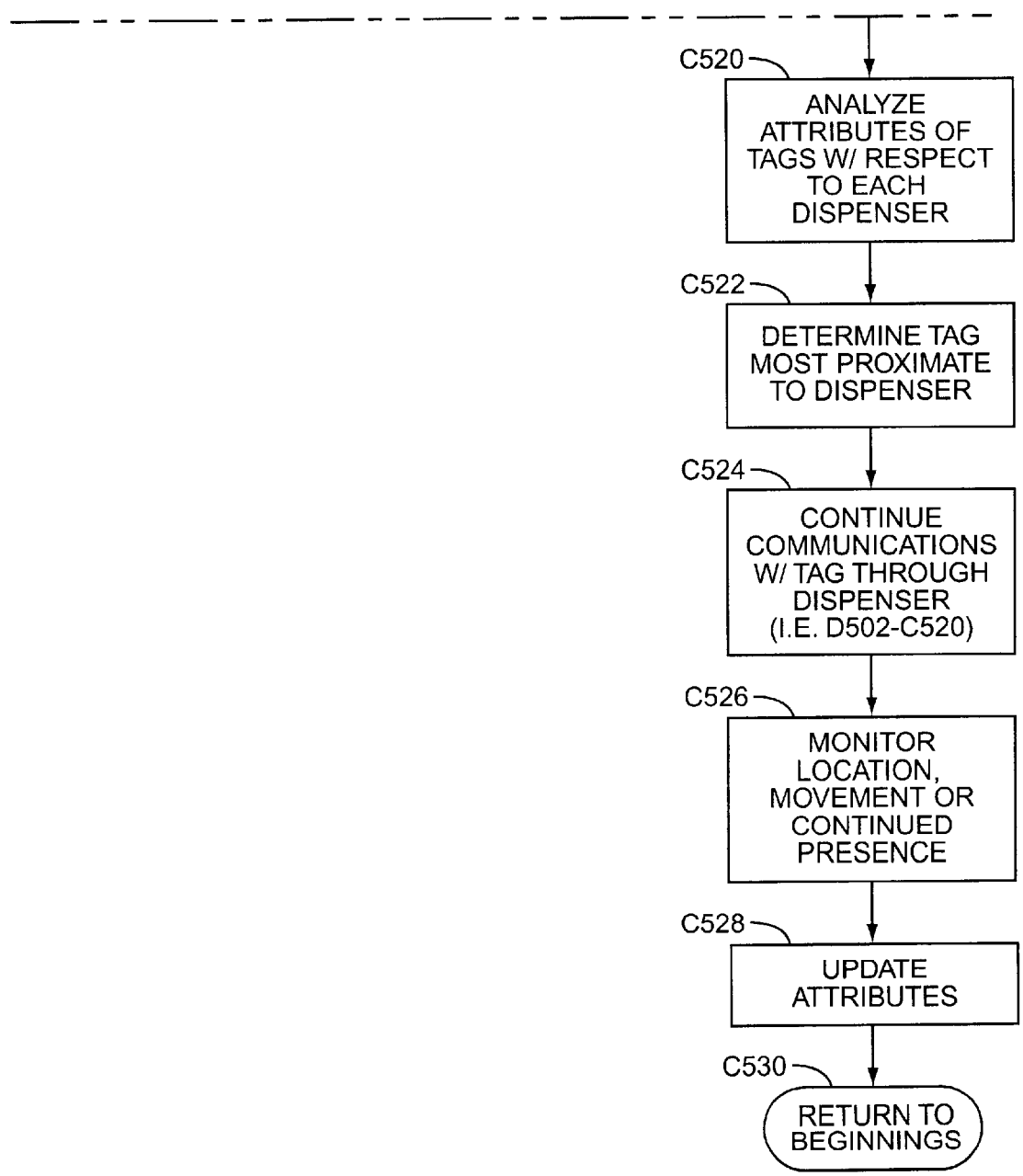
Figure 10:
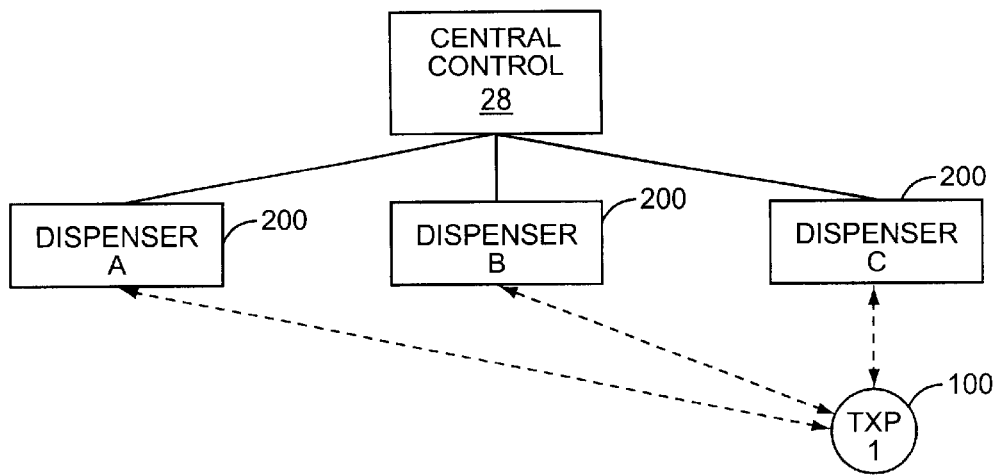
FIG. 10 is a schematic diagram of three fuel dispensers, a transponder and a central control system associated with the arbitration process of FIGS. 6A and 6B.
Figure 11:
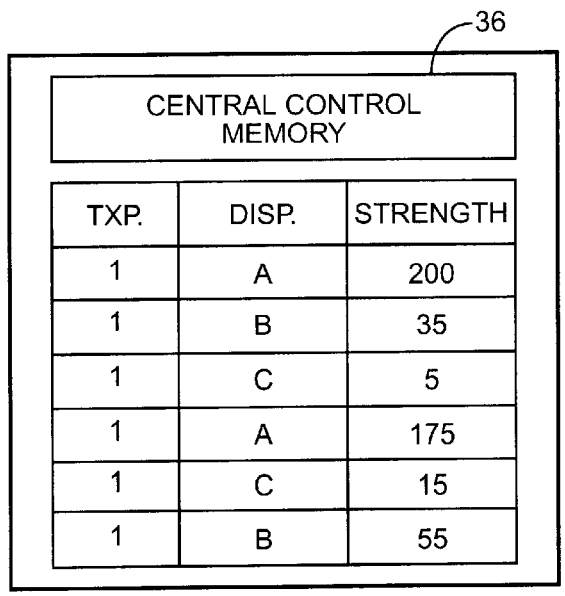
FIG. 11 is a schematic exemplary of a central control memory associated with the process shown in FIGS. 6A and 6B.

In the second preferred embodiment, the attribute and communication history is not stored in the tag's memory. The historical information is stored in a database apart from the tag and, preferably, at the central site control system 28. This process is shown in the flow chart of FIGS. 9A and 9B in association with FIGS. 10 and 11, which depict the dispenser and central control system communicating with a transponder (FIG. 10) and the central control system's memory record associated with the transponder ID, communicating dispenser, and corresponding attribute value (FIG. 11). Like the historical record shown in FIG. 8 for the first embodiment, the attribute record shown in FIG. 11 represents historical communication attributes recorded during prior communications. These records are associated with a particular transponder since they are not stored on the transponder. In other words, the historical data is simply stored in a different location than the first embodiment and associated with the transponder to which the communication relates.

In operation, the process begins (block D500) where an interrogation signal is transmitted with a dispenser ID to the various tags in the communication field (block D502). The tag receives the interrogation signal (block T504) and transmits a response with the tag ID and dispenser ID (block T506).

Next, the dispenser receives the response signal having the tag ID and dispenser ID (block D508) and monitors attributes of the received signal (block D510). The dispenser determines the transponder and dispenser ID from the received signal (block D512) and sends these ID's along with the associated attribute values to the central control system (block D514). The central control system receives the transponder ID, dispenser ID and associated attribute value (block C516) and stores this information in the central control system's memory 36 (block C518).

The central control system then analyzes the attribute values of the various transponders with respect to the various dispensers (block C520). The central control system determines the transponder most proximate to the dispenser based on this information (block C522) and operates to have the dispensers communicate with the transponders most proximate thereto in a fashion similar to that shown in blocks C502 through C520 (block C524).

The control system continues to monitor the location of the transponders, the movement of the transponders with respect to the dispensers and/or the presence or absence of the transponders in the various communication fields (block C526). Throughout the communication iterations, the various attribute values and historical records for each of the communications between the dispensers and transponders will be updated (block C528) until the fueling operation is ended, wherein the process will return to the beginning (block C530). As can be appreciated, if during fueling this continued monitoring indicates movement of the vehicle equipped with the tag in question, fueling can be terminated to avoid fuel spillage, and alarms can sound to remind the driver that the nozzle is still in his filler pipe.

Determining whether to keep historical data in the tags or at the central control system will depend upon the requirements of the application. Keeping the information in the respective tags allows each dispenser to independently arbitrate which tag is most proximate. These decisions are going on in parallel and do not require communications between the dispensers to facilitate the arbitration. Since each dispenser is provided with identical historical data and operates on that data with identical decision processes, each dispenser will arrive at the same decision. However, certain applications may find benefit in allowing communications between the dispensers through the central control system. The first embodiment allows communications to occur between the dispenser and tag at a much higher rate, because communications are not required between the dispenser and host for arbitration. The second embodiment may reduce communication rates, but will provide more centralized control and location monitoring throughout the fueling environment.

Various other modifications and improvements will occur to those skilled in the art upon reading the foregoing description. It should be understood that all such modifications and improvements have been deleted herein for the sake of conciseness and readability but are properly within the scope of the following claims.

What is claimed is:

1. A remote communication unit arbitration system comprising:
   a. a housing;
   b. a control system associated with said housing and having a memory;
   c. communication electronics operatively associated with said control system and having a transmitter for transmitting signals to a remote communication unit and a receiver for receiving signals from the remote communication unit; and
   d. attribute monitoring electronics having an output associated with said control system and an input associated with said communication electronics, said attribute monitoring electronics adapted to:
      i. monitor an attribute of a signal received by said communication electronics, the attribute being indicative of the relative proximity between the remote communication unit and the housing, and
      ii. provide said control system with a new proximity value indicative of the relative proximity between the remote communication unit and the housing;
   e. said control system adapted to:
      i. compare said new proximity value with a prior proximity value from a prior communication with the remote communication unit, and
      ii. determine a relative proximity of the remote communication unit to the housing as compared to another communicative device that communicates with the remote communication unit associated with a prior communication based on the new and prior proximity values.

2. The system of claim 1 wherein said control system is adapted to obtain the prior proximity value from a record in an interaction attribute database having a listing of records, each record including:

a. a prior proximity value associated with a prior communication with the remote communication unit from a communicative device, and b. identification indicia of the communicative device.

3. The system of claim 2 wherein the interaction attribute database is located at the remote communication unit, said control system adapted to access the database via radio communications through said communication electronics.

4. The system of claim 2 wherein the interaction attribute is located at a central control system apart from said housing, said control system adapted to communicate with the central control system.

5. The system of claim 2 wherein said control system is further adapted to cause the new proximity value to be added as a record to the interaction attribute database in association with a unique identification indicia representative of a communicative device.

6. The system of claim 2 wherein said control system determines the relative proximity of the remote communication unit by determining the proximity value representative of the closest proximity.

7. A remote communication unit facilitating arbitration in a multiple communicative device environment comprising:

a. radio communication electronics adapted to receive information from a plurality of communicative devices and transmit information to the communicative devices;

b. a memory having an interaction attribute database having a listing of records, each record including:
 i. an interaction attribute associated with a prior communication between said remote communication unit and a communicative device, and
 ii. an identification indicia of the respective communicative device; and c. a control system operatively associated with said communication electronics and said memory and adapted to:
 i. receive an interactive attribute and associated identification indicia from a first communicative device via said communication electronics;
 ii. store the interactive attribute and associated identification indicia from the first communicative device in said database;
 iii. receive an interactive attribute and associated identification indicia from a second communicative device via said communication electronics;
 iv. store the interactive attribute and associated identification indicia from the second communicative device in said database; and
 v. transmit the interactive attributes and associated identification indicia to a communicative device via said communication electronics;
 vi. said communication device compares the interactive attribute for the first communicative device with the interactive attribute for the second communicative device.

8. The method of claim 7 wherein the interaction attribute database is located at a central control system, said control system adapted to communicate with the central control system.

9. The method of claim 7 wherein said control system is further adapted to store the interactive attribute and associated identification indicia for the first communicative device in said database in association with a unique identification indicia representative of the first communicative device.

10. The method of claim 7 wherein said control system is further adapted to store the interactive attribute and associated identification indicia for the second communicative device in said database in association with a unique identification indicia representative of the second communicative device.

11. The method of claim 7 wherein said communication device compares the interactive attribute for the first communicative device with the interactive attribute for the second communicative device.

* * * * *